(12) United States Patent
Drecq et al.

(10) Patent No.: US 6,539,782 B1
(45) Date of Patent: Apr. 1, 2003

(54) LOAD MACHINE FOR A COMBUSTION ENGINE TEST BENCH

(75) Inventors: Daniel Drecq, Saint Leger en Yvelines (FR); Antoine Lesobre, Boulogne (FR); Hamid Ben Ahmed, Rennes (FR); Laurent Prevond, Villeparisis (FR)

(73) Assignee: Borghi Saveri France, Trappes (FR)

( * ) Notice: Subject to any disclaimer, the term of this patent is extended or adjusted under 35 U.S.C. 154(b) by 0 days.

(21) Appl. No.: 09/545,004

(22) Filed: Apr. 6, 2000

(30) Foreign Application Priority Data

Apr. 29, 1999 (FR) .............................. 99 05452

(51) Int. Cl.[7] .......................... G01L 3/26; G01L 1/708
(52) U.S. Cl. ........................................ 73/116; 73/862
(58) Field of Search ............................... 73/118.1, 116, 73/862; 310/105, 214; 318/302

(56) References Cited

U.S. PATENT DOCUMENTS

| | | | | |
|---|---|---|---|---|
| 2,348,175 A | * | 5/1944 | Cripps | 265/24 |
| 3,838,323 A | * | 9/1974 | Anderson | 318/302 |
| 4,920,788 A | * | 5/1990 | Ando et al. | 73/118.1 |
| 5,459,363 A | * | 10/1995 | Miyakawa et al. | 310/214 |

FOREIGN PATENT DOCUMENTS

| JP | 55001573 | * | 1/1980 | G01L/3/22 |
|---|---|---|---|---|

OTHER PUBLICATIONS

Patent Abstracts of Japan, Publication No. 55001573, Jan. 8, 1980.

* cited by examiner

*Primary Examiner*—Eric S. McCall
*Assistant Examiner*—Maurice Stevens
(74) *Attorney, Agent, or Firm*—Young & Thompson

(57) ABSTRACT

A load machine for a combustion engine test bench includes at least one eddy-current brake associated with at least one electric drive. The brake includes a toothed ferromagnetic rotor secured to a shaft mounted so that it can rotate through a casing containing at least one induction coil borne by an internal peripheral region of the casing, so as to generate a magnetic field across which the rotor is intended to pass in order to generate eddy currents which brake the rotation of the shaft. The shaft is coupled to the combustion engine to be tested, and the electric drive is a variable-reluctance electric motor.

29 Claims, 6 Drawing Sheets

LOAD MACHINE FOR A COMBUSTION ENGINE TEST BENCH

Figure 3:
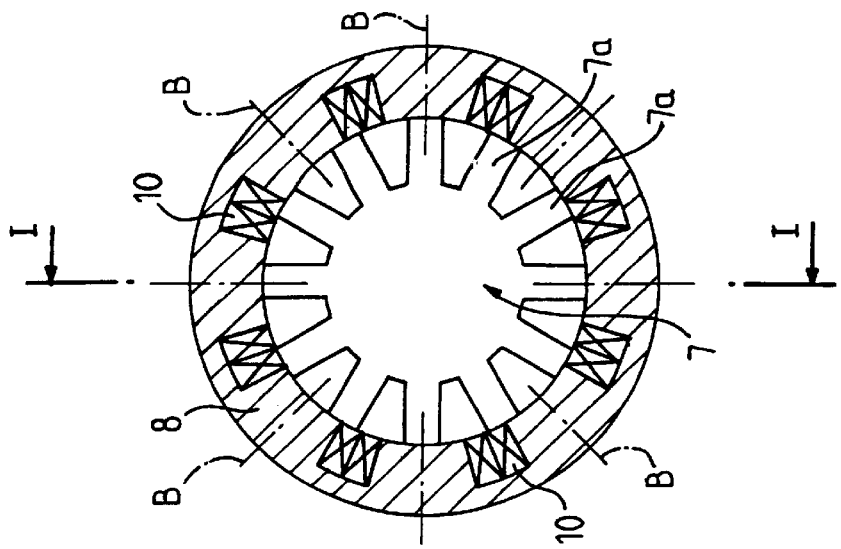

The present invention relates to a load machine for a test bench for the dynamic testing of combustion engines, for example of the diesel or gasoline or gas type.

When a combustion engine is coupled to a load machine on a test bench, the load machine has to be able to brake the rotation of the drive shaft, so as to simulate operation of the engine, as a function of friction with the ground, with the air and as a function of the inertia and speed of the vehicle, under various engine speed/load conditions.

Hydraulic brake machines are already known and have the advantages of low inertia and small size with respect to the braking power that can be supplied, and low cost. However, hydraulic brake machines are in increasingly dwindling use, because they do not allow precise regulation, given that the regulator acts on a fluid with a relatively slow response time. Hence, a hydraulic brake machine is not suited to a combustion engine equipped with an ignition and injection computer requiring high-precision regulation for developing the mapping. Furthermore, it is difficult to manufacture a hydraulic machine which is capable both of braking and of driving the combustion engine.

Eddy-current brakes are the machines most commonly used in test benches for touring-car or competition car engines and truck engines. Eddy-current brakes allow high-precision regulation and have a modest cost for a low or moderate power supplied. By contrast, eddy-current brakes which supply high power are expensive and require a large-diameter rotor in order to be able to operate at low speed and high torque, thus increasing the weight and inertia of the rotor. Furthermore, an eddy-current brake is unable to drive a combustion engine.

In general, an eddy-current brake machine comprises a rotor made up of a toothed ferromagnetic disk rotating in a magnetic field, the teeth of the disk causing a variation in induction and therefore eddy currents at the surfaces of the two metallic parts located on each side of the rotor; these currents move with the rotor in the magnetic field and in return bring about a torque that brakes the rotor, this being the desired effect; a significant amount of energy is dissipated by a Joule effect. The element which generates the magnetic field is an electrically powered coil, for example powered with ac current or chopped dc current, secured to the casing of the machine. The heat dissipated by Joule effect is removed by a bank of heat exchangers, also secured to the casing, which are supplied with coolant by means of appropriate pipe-work.

In order to be able to study the behavior of the combustion engine under engine-braking conditions, it is necessary to add a means of rotating the drive shaft. However, such a drive means does not need to be able to develop 100% of the power of the combustion engine, but simply of the order of 40% of full load, to in fact simply compensate for the kinetic energy of the vehicle. By way of example, if the combustion engine has a power of 200 kW, the eddy-current brake has also to have a power of 200 kW, whereas the drive means need merely have a power of the order of 80 kW.

This is because the brake machine has to be able to compensate for the nominal power of the combustion engine, which depends on the geometric and mass characteristics of the vehicle, with regard to the maximum speed to be achieved, whereas the drive means has simply to be able to simulate the power for driving the combustion engine which depends only on the inertia of the vehicle under phases of deceleration or downhill travel.

Dc electric motors or asynchronous ac motors have already been used by way of drive means, these being coupled in line with the eddy-current brake machine. However, coupling such an electric motor to an eddy-current brake machine has the effect of doubling the length requirement (1.5 m instead of 0.75 m), doubling the inertia and tripling the cost, by comparison with the eddy-current brake machine alone.

Having high inertia in the load machine makes it difficult to raise the speed of the engine quickly. This is a particularly sensitive issue in the case of combustion engine testing for the engines of competition cars, for example, Formula 1 cars, in which the engine has to be able to accelerate from 0 to 15,000 rpm in one second.

It has also been proposed that the eddy-current brake/electric motor machine assembly be replaced by a single dc or asynchronous ac electric motor. The same motor can thus be used to perform dynamic testing, that is to say can operate either as a brake or as a generator. The motor thus allows on-road operation simulation testing to be carried out taking the mass of the simulated vehicle into consideration, including gearshifts. This simulation of the giving-up of the energy stored by the component which absorbs the energy of the combustion engine also finds a few applications outside of cars and trucks. However, the inertia of such an electric motor is about three times greater than that of an eddy-current brake alone, and the cost is about five times higher. This is because when the electric motor is used as a brake, it operates as an alternator or dynamo, that is to say produces electric current which has to be returned to the network. Given the power developed by combustion engines and therefore the strength of the current generated, it is necessary to associate a special cabinet with the electric motor in order to return the current to the electricity network. Furthermore, for example, in the case of a 200 kW brake, the length occupied by this electric motor is of the order of 1.5 m, whereas an eddy-current brake-machine is just 0.75 m long.

Furthermore, the use of dc electric motors in a combustion engine test bench is difficult, because the operation of the wipers or brushes of the electric motor in an oily environment has to be taken into consideration. What is more, asynchronous motors have high inertia and the rotor, which becomes very hot, is difficult to cool because it is a rotating part.

The object of the invention is to eliminate the aforementioned drawbacks and propose a load machine which operates both as a brake or as a generator while at the same time, by virtue of the passive rotor, having low inertia and therefore being highly suited to high speeds, and in which the heating affects the parts external to the rotor, hence making them very easy to cool. Furthermore, the use of a variable-reluctance motor makes it possible to operate either as a brake or as a generator. Finally, the cost of such a machine will be modest. Another object of the invention is to propose such a load machine which occupies only a small amount of space in the lengthwise direction.

To this end, the subject of the invention is a load machine for a combustion engine test bench, comprising at least one eddy-current brake means associated with at least one electric drive means, said brake means comprising a toothed ferromagnetic rotor secured to a shaft mounted so that it can rotate through a casing containing at least one induction coil borne by an internal peripheral region of the casing, so as to generate a magnetic field across which the rotor is intended to pass in order to generate eddy currents so as to brake the rotation of the shaft, said shaft being intended to be coupled to the combustion engine to be tested, characterized in that the electric drive means forms a variable-reluctance electric motor. The eddy currents are not therefore generated in the rotor but in the metal parts located on each side thereof.

In a first embodiment, the variable-reluctance motor is mounted in series with the brake means and comprises a stator secured to two opposed side walls through which the aforementioned shaft rotatably passes, so that one of said walls is adjacent to the casing of the brake means, a ferromagnetic rotor secured to the shaft and spaced axially from the toothed ferromagnetic rotor, and a number of excitation coils arranged on said stator around the periphery of the ferromagnetic rotor, so as to generate a magnetomotive force for driving the rotor. An assembly of this kind is admittedly longer than an eddy-current brake machine alone, but is shorter than an asynchronous electric motor or dc electric motor. Furthermore, the machine according to this first embodiment has lower inertia given that no rotor is fitted with coils. Of course, it is possible to mount several rotors in series along the same shaft.

In another embodiment, the variable-reluctance motor is incorporated into the brake means, the toothed ferromagnetic rotor acting also as a rotor for the electric motor, the latter comprising a number of excitation coils housed in the casing to generate a magnetomotive force for driving the rotor. In this case, the shaft intended to be coupled to the combustion engine has just one single rotor, thus greatly reducing its inertia and the overall space occupied by the machine (for example 0.5 to 0.75 m in terms of length). In fact, the inertia of the machine according to the second embodiment is approximately equal to that of an eddy-current brake alone. The cost of such a machine is relatively low, of the order of one to 1.5 times the cost of an eddy-current brake machine.

In an alternative form, the electric motor comprises at least one ferromagnetic stator inserted radially between the internal periphery of an induction coil coaxial with the rotor and the external periphery of said rotor, the excitation coils being arranged on the internal periphery of the stator so that their respective axes extend radially with respect to the rotor and are uniformly angularly spaced.

In another alternative form, the electric motor comprises a ferromagnetic stator inserted axially between two side induction coils coaxial with the rotor, said stator peripherally surrounding the rotor, the excitation coils being arranged on the internal periphery of the stator in such a way that their respective axes extend radially with respect to the rotor and are uniformly angularly spaced.

In a first scenario, the two induction coils extend one on each side of the excitation coils in the axial direction of the shaft. This alternative form makes it possible to reduce the space occupied in terms of diameter by comparison with the previous alternative form, but at the expense of length. Furthermore, installing a second induction coil for braking increases the cost of the machine. In a second scenario, the two induction coils are inserted radially between the excitation coils and the internal periphery of the casing.

According to yet another alternative form, the induction coil is coaxial with the rotor and peripherally surrounds it, the excitation coils being arranged on the internal faces of two side walls spaced axially from the casing so that their respective axes are parallel and uniformly angularly spaced with respect to the axis of the rotor, all of the axes of the excitation coils lying inside a circular cylinder centered on the axis of the rotor and with a smaller radius than this rotor. Advantageously, the casing comprises, projecting from the internal faces of said side walls, a heat exchanger facing the rotor, the aforementioned excitation coils being housed in slots made in the heat exchanger.

According to yet another alternative form, two variable-reluctance motors are incorporated into the brake means, the rotor comprising, on each side of its plane, two axial extensions which are toothed at their periphery and located facing two ferromagnetic stators peripherally surrounding each axial extension of the rotor, in the casing, two separate series of excitation coils being arranged on the internal periphery of each stator, to define the aforementioned two motors.

Advantageously, the casing comprises, projecting from its internal side faces, a heat exchanger facing the rotor, the induction coil being coaxial with the rotor and peripherally surrounding the heat exchanger and the rotor, the aforementioned two stators being peripherally surrounded by the heat exchanger.

According to another feature of the invention, the rotor has a number of radial arms which are uniformly angularly spaced and connected together by median webs in the shape of angular sectors of lesser thickness than the arms. Advantageously, each arm extends radially beyond the webs of the rotor to define a number of teeth at the periphery of the rotor.

According to yet another feature, each induction coil is powered with dc current chopped at a fixed frequency and the excitation coils are powered with dc current chopped at a higher frequency which may be a variable frequency.

To give a better understanding of the subject of the invention, a number of embodiments thereof, which are depicted in the appended drawing, will now be described by way of purely illustrative and nonlimiting examples.

Figure 2:
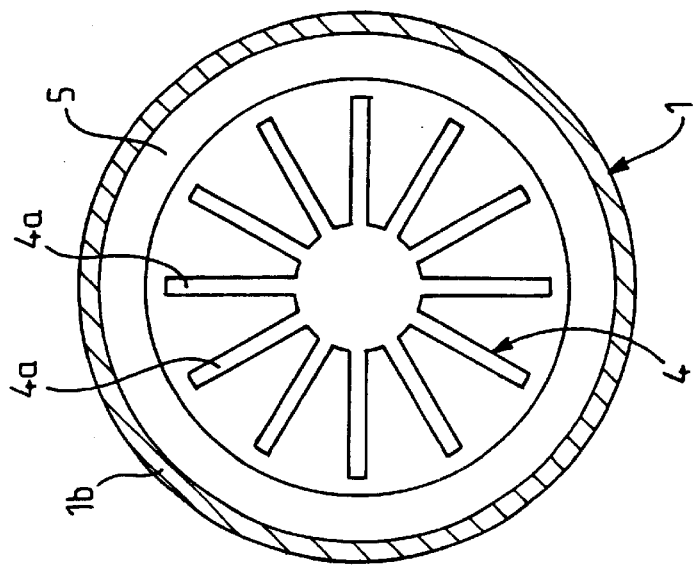
Figure 1:
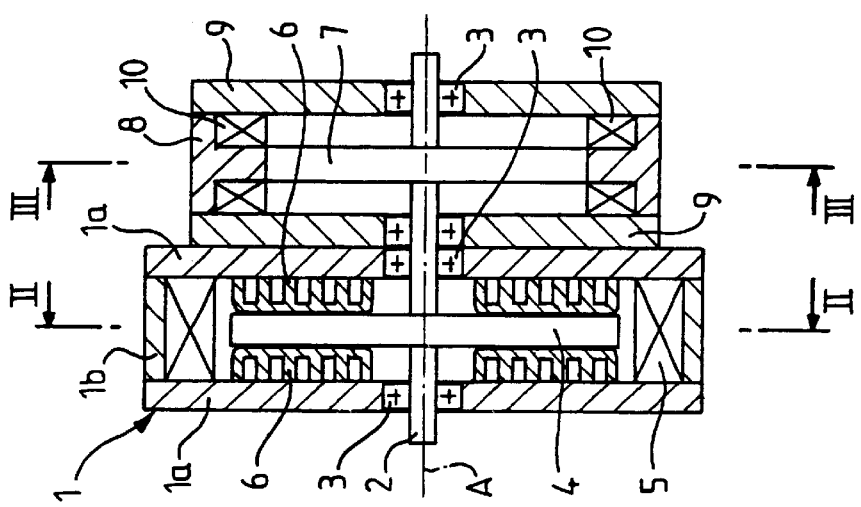
Figure 5:
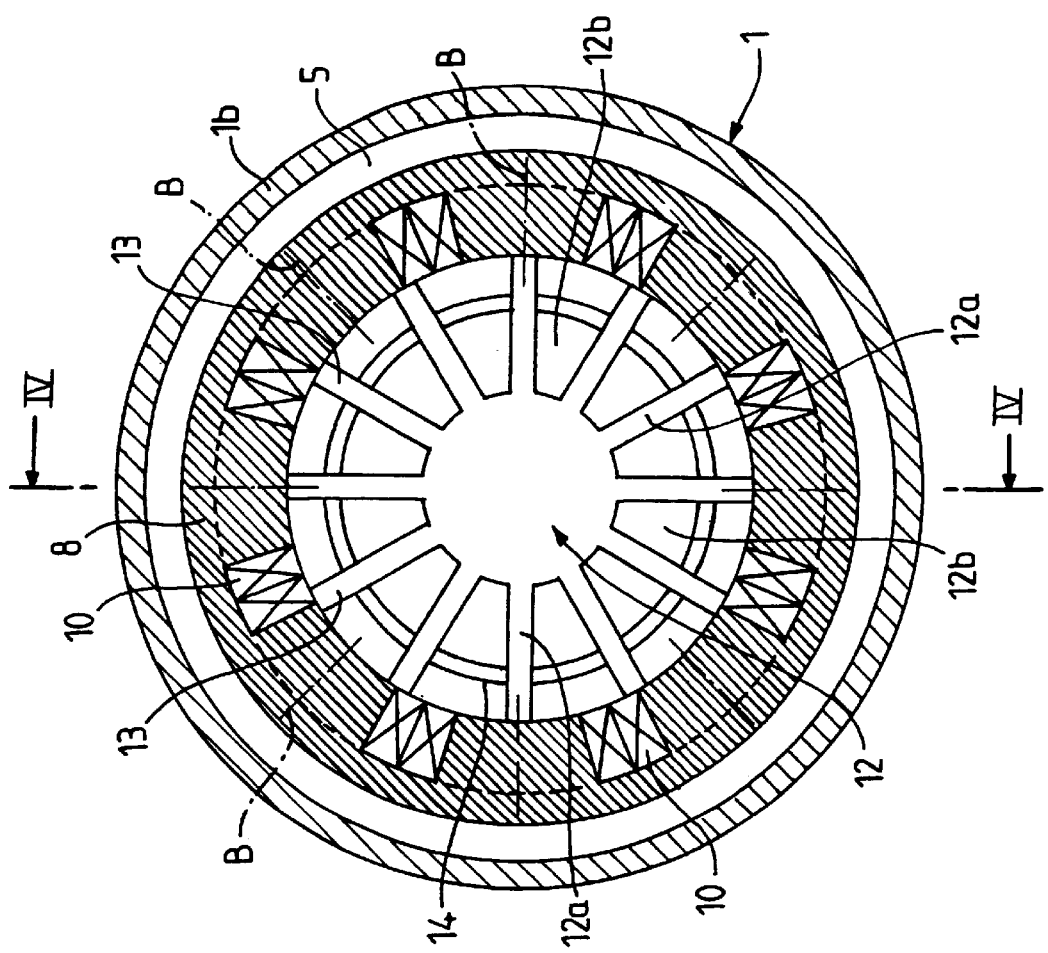
Figure 4:
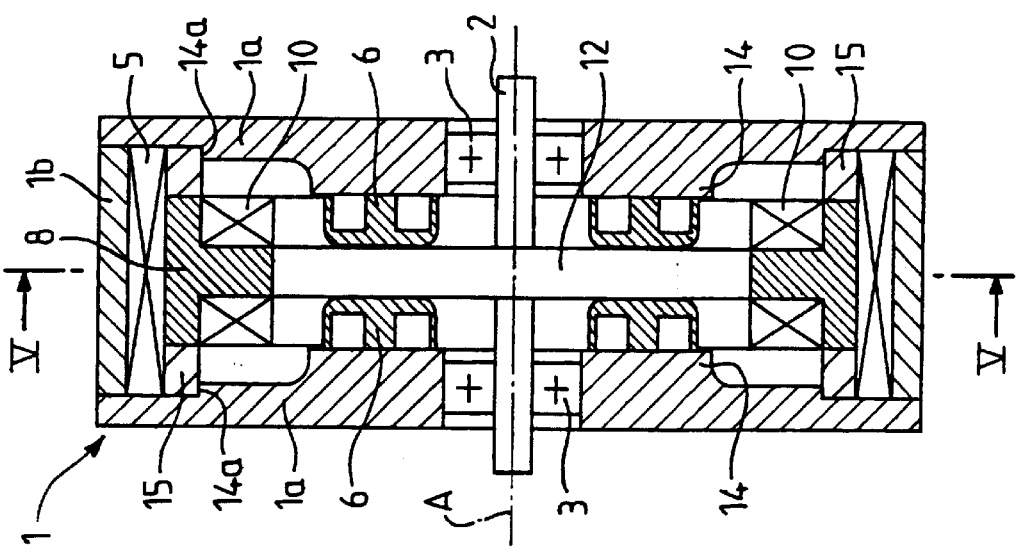
Figure 7:
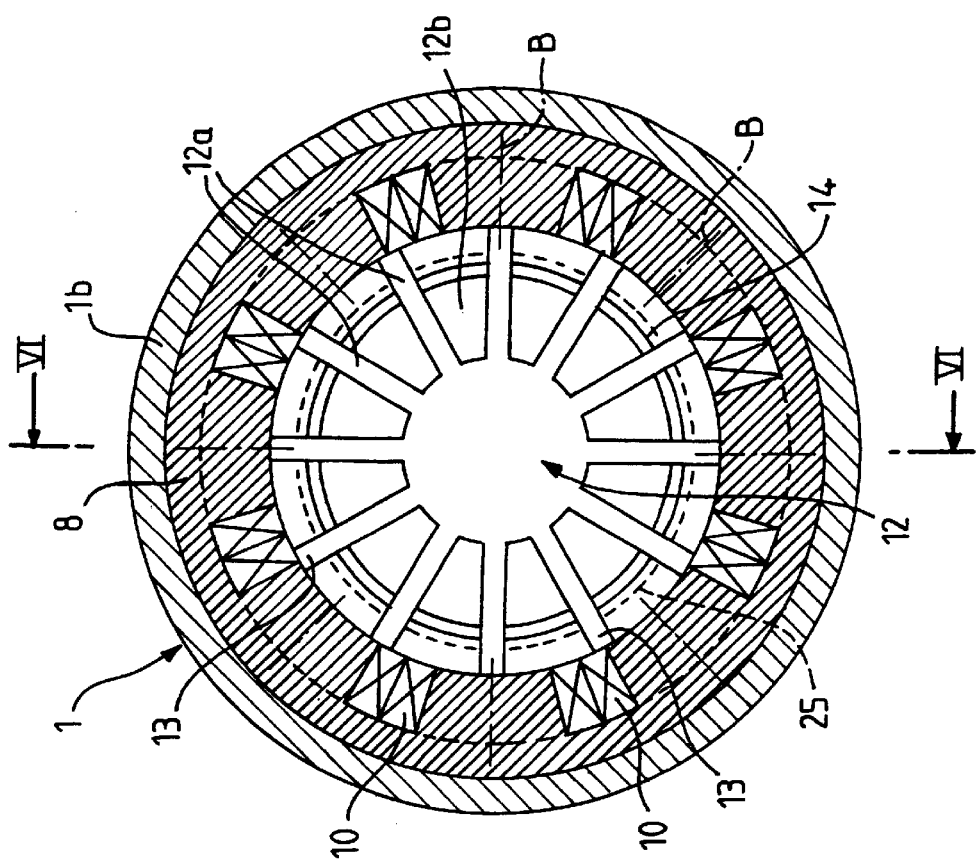
Figure 6:
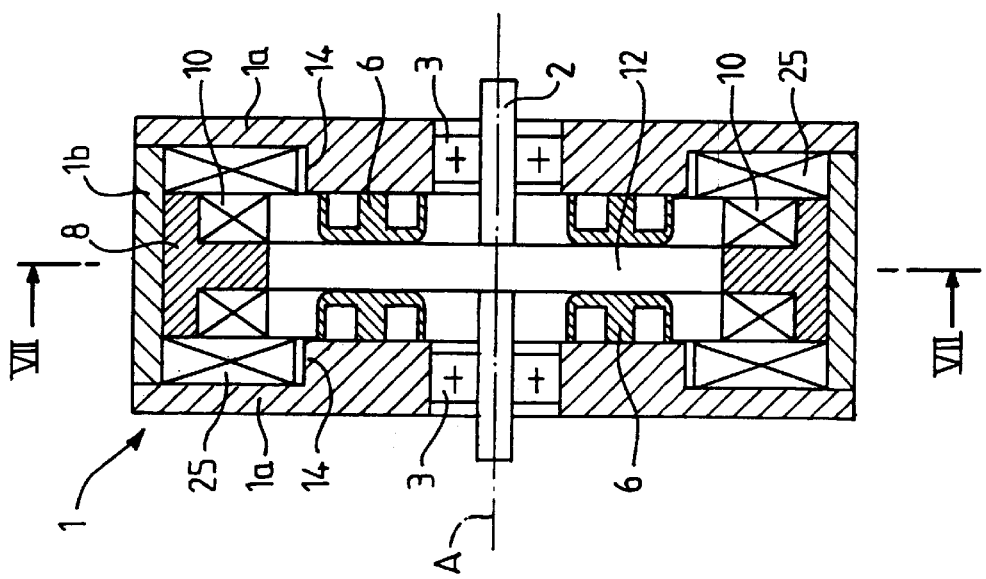
Figure 10:
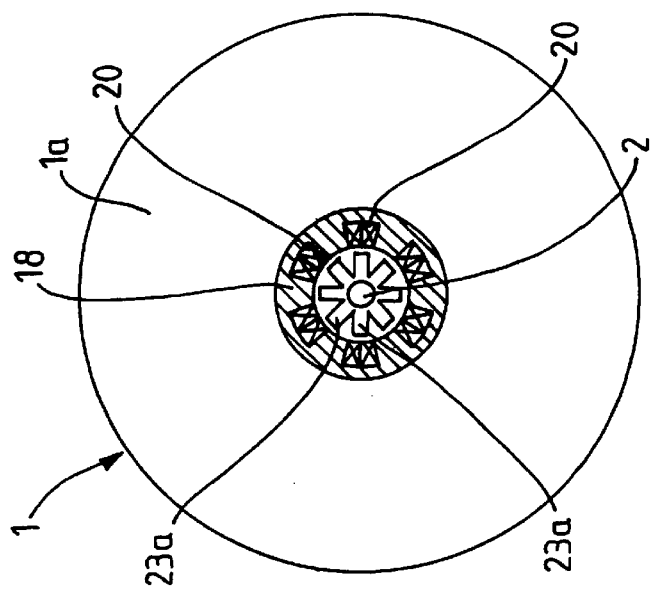
Figure 9:
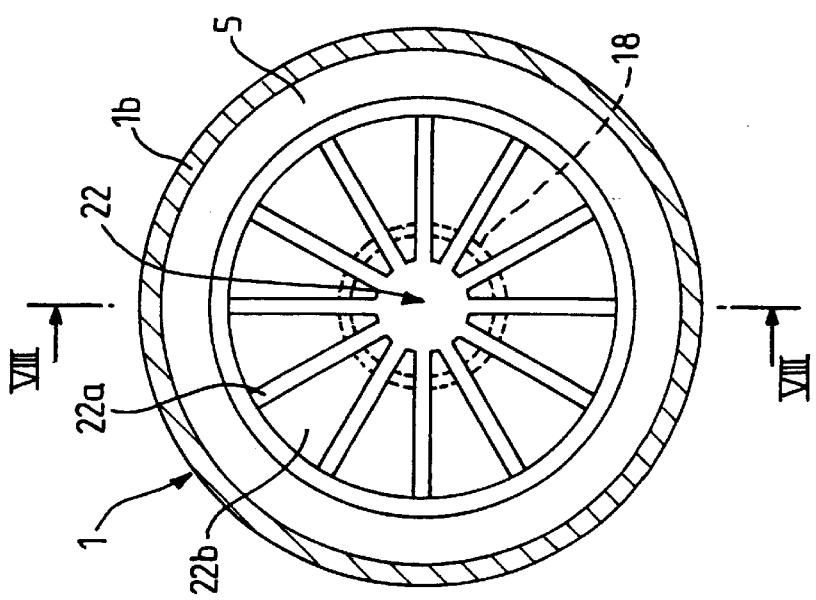
Figure 8:
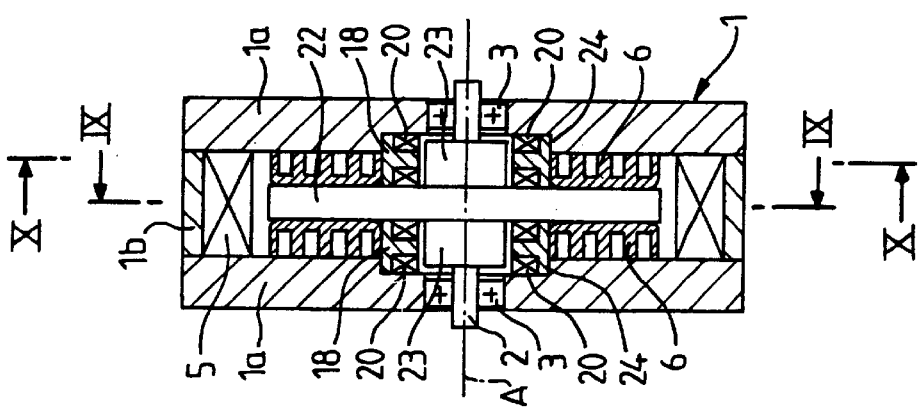
Figure 12:
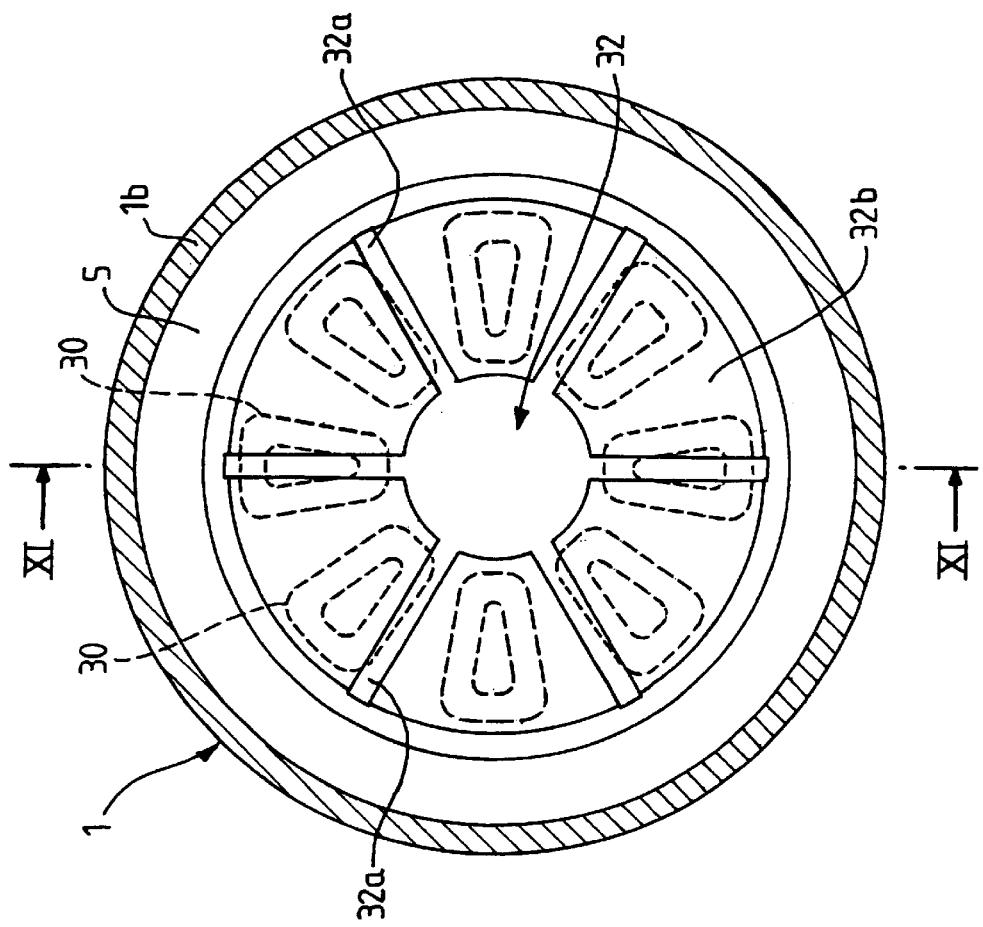
Figure 11:
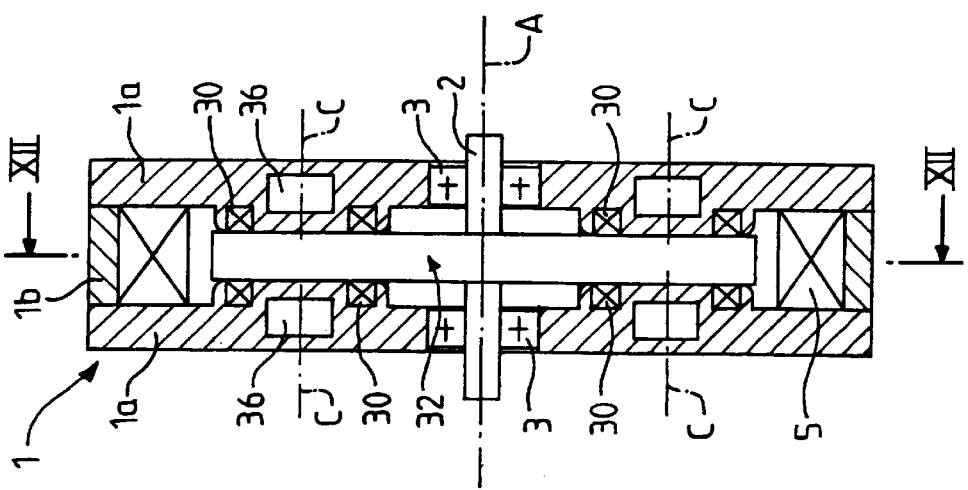
Figure 13:
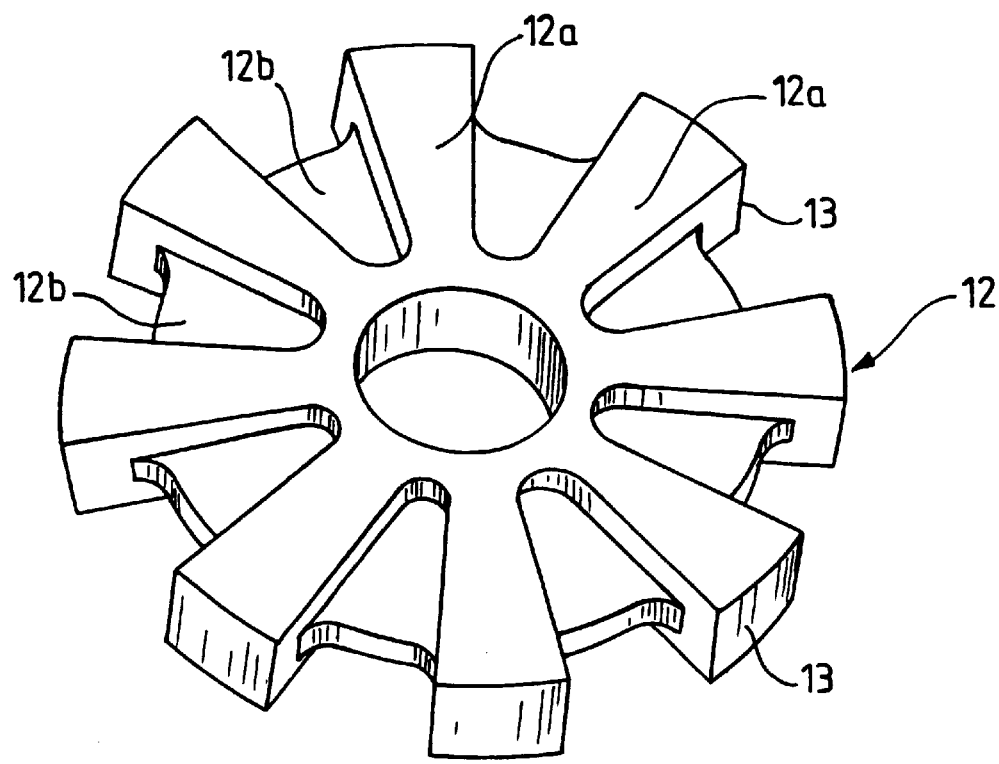
Figure 14:
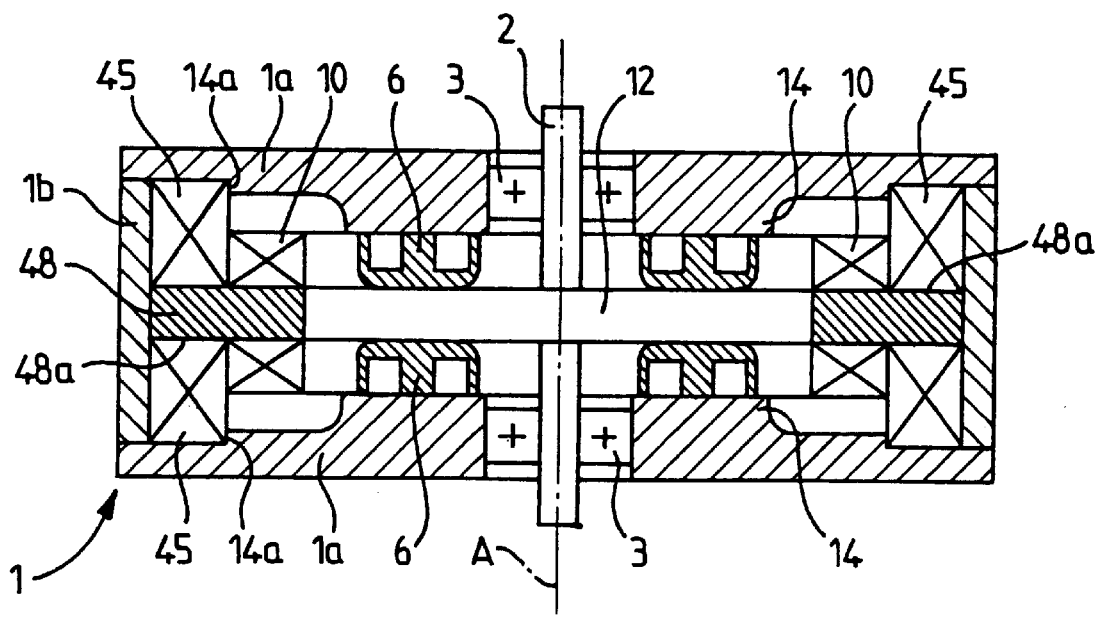

In this drawing:

FIG. 1 is a view in axial section on the line I—I of FIG. 3 of a first embodiment of the machine of the invention, FIGS. 2 and 3 are views in cross section on the lines II—II and III—III of FIG. 1, respectively depicting the braking means and the driving means of the machine, FIG. 4 is a view in axial section of a second embodiment of the machine of the invention, on the line IV—IV of FIG. 5, FIG. 5 is a view in cross section on the line V—V of FIG. 4, FIG. 6 is a view in axial section on the line VI—VI of FIG. 7, depicting another alternative form of the machine of the invention, FIG. 7 is a view in cross section on the line VII—VII of FIG. 6, FIG. 8 is a view in axial section on the line VIII—VIII of FIG. 9, depicting another alternative form of the machine of the invention comprising an eddy-current brake associated with two variable-reluctance electric motors, FIGS. 9 and 10 are views in cross section on the lines IX—IX and X—X of FIG. 8, respectively depicting the braking part and the driving part of the machine, FIG. 11 is a view in axial section on the line XI—XI of FIG. 12, depicting yet another alternative form of the machine of the invention, FIG. 12 is a view in cross section on the line XII—XII of FIG. 11, FIG. 13 is a perspective view of a particular embodiment of the rotor intended to be used in a machine according to the invention, and FIG. 14 is a view similar to FIG. 4, but according to another embodiment of the invention.

A first embodiment of the machine according to the invention will now be described with reference to FIGS. 1 to 3.

The machine comprises a casing 1, the side walls 1a of which are in the form of circular disks pierced at their center and the longitudinal wall 1b of which is of circular cylindrical shape. A rotating shaft 2 is mounted, via rolling bearings 3, through the side walls 1a of the casing 1. The shaft 2 is intended to be coupled to one end of a combustion engine that is to be tested.

The shaft 2 rotates as one with a toothed ferromagnetic rotor 4 which extends inside the casing 1. As better visible in FIG. 2, the rotor 4 has a circular central section of small diameter extended radially by a number of arms 4a uniformly angularly spaced about the axis A of the shaft 2. By way of example, the rotor 4 has twelve arms 4a. Although this has not been depicted, the arms 4a may be connected together by median webs in the shape of angular sectors of lesser thickness.

A circular induction coil 5 is borne by the internal periphery of the cylindrical longitudinal wall 1b of the casing 1, to generate an axial magnetic field. The coil 5 is spaced radially from the free ends of the arms 4a of the rotor 4, as visible in FIGS. 1 and 2.

An annular heat exchanger 6 consisting of cooling passages, is borne, projecting, by the two internal faces of the side walls 1a of the casing 1. The heat exchangers 6 constitute boxes in which coolant, for example water, circulates. The heat exchangers are spaced axially from the rotor 4 by a small clearance which forms a small air gap. The annular boxes 6 extend radially between the shaft 2 and the induction coil 5. As a preference, the heat exchangers 6 extend only facing the rotor 4.

A second rotor 7 made of ferromagnetic material is secured to the shaft 2 a sufficient distance away from the rotor 4 for the rotor 7 not to be contained in the casing 1. A stator 8 made of ferromagnetic material peripherally surrounds the rotor 7 and is closed at its two axial ends by two circular disk shaped walls 9 pierced at the center, through which the shaft 2 is mounted, via rolling bearings 3.

As is better visible in FIG. 3, the ferromagnetic rotor 7 has a number of teeth 7a, for example, twelve teeth, at its periphery, defining a variable air gap between the rotor and the stator so as to vary the reluctance of the electric motor.

On its internal periphery, the stator 8 has approximately rectangular slots in which the excitation coils 10, the axes B of which extend radially with respect to the axis A of the rotor 7, are housed. The slots formed on the internal periphery of the stator 8 define a toothed stator, for example, in this instance, with eight teeth.

The assembly 7 to 10 constitutes a variable-reluctance electric motor which will not be described further in detail, because it is known in itself.

As visible in FIG. 1, the adjacent walls 1a and 9 are placed back-to-back in order to reduce the length of the load machine.

In a way also known per se, the ferromagnetic stator 8 consists of a stack of coaxial laminations perpendicular to the axis A, so as to reduce magnetic losses upon passing the magnetic field.

Heat exchangers may also be installed on the internal faces of the walls 9 of the electric motor.

Another embodiment of the invention will now be described with reference to FIGS. 4 and 5. The same reference figures will be used to denote elements which are identical or similar to the first embodiment.

The variable-reluctance electric motor is, in this instance, incorporated into the eddy-current brake means. In effect, the machine has a single rotor 12 consisting of a central hub of circular cross section from which a number of uniformly angularly spaced radial arms 12a extend, the radial arms 12a being connected together by median webs 12b with the shape of angular sectors of lesser thickness than the arms. As better visible in FIG. 13, the arms 12a extend radially beyond the webs 12b so as to define a number of teeth 13 on the exterior periphery of the rotor 12. The rotor 12 is made of ferromagnetic material.

The side walls 1a of the casing 1 comprise an annular flange 14 projecting axially inward to define a surface against which the heat exchanges 6 can rest. As a preference, the outside diameter of the heat exchangers 6 is roughly equal to the outside diameter of the webs 12b of the rotor 12.

Near their periphery, the walls 1a on their internal face have an annular depression 14a intended to accommodate, in succession, in a radial direction, an annular holding piece 15, the induction coil 5 and the longitudinal wall 1b of the casing 1. The holding piece 15 consists of a hollow cylindrical sleeve intended to hold the stator 8 laterally at the center of the casing 1. The stator 8 practically surrounds the heat exchangers 6 and the rotor 12. The induction coil 5 extends over the entire length of the cylindrical wall 1b and surrounds both the stator 8 and the holding pieces 15.

The induction coil 5 in the machine of the second embodiment illustrated in FIGS. 4 and 5, has a larger diameter than the coil of the first embodiment, because, in the second embodiment, the stator 8 is inserted between the rotor 12 and the coil 5.

In the alternative form illustrated in FIGS. 6 and 7, the overall diameter of the casing 1 is reduced by comparison with the second embodiment illustrated in FIGS. 4 and 5. This is because, in FIG. 6, the stator 8 is in contact via its outer periphery with the cylindrical wall 1b of the casing 1, and two induction coils 25 are wound on each side of the stator 8, around the annular flanges 14 of the side walls 1a of the casing 1. In this case, it may be seen that each induction coil 25 may laterally surround the stator 8 and part of the teeth 13 of the rotor 12. The axial thickness of each coil 25 is equal to that of the flange 14. The two induction coils 25 extend one on each side of the excitation coils 10, in the axial direction.

In point of fact, the annular flanges 14 are needed in the alternative form illustrated in FIG. 6, for housing the two induction coils 25, whereas in the alternative form of FIG. 4, the annular flanges 14 could be omitted. In this case, the axial size of the machine of FIG. 6 would be increased by comparison with that of the machine of FIG. 4 which has no flanges 14.

Another alternative form of the machine of the invention will now be described with reference to FIGS. 8 to 10.

Starting with the casing 1 illustrated in FIG. 1, it can be seen that the casing 1 in FIG. 8 has thicker side walls 1a, so that they have a central bore 24 on their internal faces, each bore 24 being intended to house a stator 18.

The rotor 22 is also toothed and ferromagnetic in this instance, so as to incorporate two variable-reluctance electric motors into the same eddy-current brake machine. The rotor 22 has a number of radial arms 22a which may be connected together by median webs 22b of lesser thickness, as in the scenario of FIG. 1. The radial arms 22a do not extend beyond the median webs 22b because there is no need to provide teeth at the external periphery of the rotor 22, facing the induction coil 5. By contrast, the central hub of the rotor 22 has two axial extensions one on each side of its mid-plane, said axial extensions 23 having a number of radial arms 23a, the radial dimensions of which are markedly smaller than those of the arms 22a, so as to define a number of teeth at the periphery of the extensions 23, which constitute the rotor of each variable-reluctance electric motor. Each extension 23 is peripherally surrounded by a stator 18 which, on its internal periphery, has a number of excitation coils 20, having their axis extending radially with respect to the shaft 2.

FIGS. 11 and 12 depict yet another alternative form of the invention.

In this alternative form, the rotor 32, which is still toothed and ferromagnetic, comprises a number of radial arms 32a which extend from a central hub and a number of webs 32b which may angularly connect the arms 32a without these arms extending radially beyond the webs. By way of example, the rotor 32 in this instance has six radial arms 32a.

Unlike the other alternative forms illustrated in FIGS. 1 to 10, the excitation coils 30 of the variable-reluctance electric motor are not arranged with their axis extending radially with respect to the rotor but with their respective axis C running parallel to the axis A of the rotor. The excitation coils 30 are arranged on the internal faces of the side walls 1a of the casing 1. All of the axes C of the excitation coils 30 lie inside a circular cylinder centered on the axis A of the rotor 32 and with a radius smaller than that of the rotor, so that each coil 30 lies facing the arms 32a of the rotor 32. In this case, the variable air gap between the excitation coils 30 and the rotor 32 is defined by the difference in thickness between the arms 32a and the median webs 32b of the rotor 32, if such webs exist. This difference in thickness is better visible in FIG. 13. By way of example, the excitation coils 30 are wound around a triangular or trapezoidal core.

In fact, the excitation coils 30 are placed in annular slots formed on the internal side faces of the heat exchangers 36. The heat exchangers 36 are, in this instance, formed in the thickness of the side walls 1a of the casing 1, said side walls 1a having an annular increased thickness projecting toward the inside of the casing in the region of said heat exchangers 36.

In the alternative form illustrated in FIG. 14, the machine differs from the one illustrated in FIGS. 4 and 5 in that the stator 48 comprises, on each side of its mid-plane, an annular groove 48a which is intended to house the respective induction coil 45. The two induction coils 45 are wound one on each side of the stator 48, between the annular depressions 14a and the cylindrical wall 1b of the casing 1. Each induction coil 45 is peripherally circumscribed around a portion of each excitation coil 10.

Whatever the alternative form depicted in FIGS. 1 to 14, the load machine according to the invention can operate simultaneously in brake mode and in generator mode, or alternatively can operate solely in brake mode or solely in generator mode. Even when there is a desire to test a combustion engine on the test bench, under normal speed and load conditions without engine braking, the excitation coils of the variable-reluctance electric motor may be supplied with current so as to compensate for the magnetic losses which are due to the magnetic remanence of the rotor because of the operation of the eddy-current brake.

By way of example, the induction coils of the brake and the excitation coils of the generator are supplied with dc current, with a current strength of the order of 15A and a voltage of the order of 200V. By contrast, the chopping frequency of the current sent into the braking coils is fixed, whereas the chopping frequency of the current sent into the coils of the motor is higher and may be variable.

In general, the rotor will have a number of teeth or arms which may differ from the number of excitation coils. This number may be an even number or an odd number.

For details of the specific structure of the eddy-current brake machine illustrated in FIG. 2, reference may be made to European patent application No. 802 403. In any event, the torque may be measured by a balance arm device or with a torque meter, as described in European patent application No. 802 403.

Although the invention has been described in conjunction with a number of particular alternative forms, it is quite obvious that it is not in any way restricted thereto and that it comprises all technical equivalents of the means described and their combinations, if these fall within the scope of the invention.

What is claimed is:

1. A load machine for a combustion engine test bench, comprising:
    at least one eddy-current brake means associated with at least one variable-reluctance electric motor,
    said brake means comprising a toothed ferromagnetic rotor secured to a shaft mounted so as to rotate through a casing containing at least one induction coil borne by an internal peripheral region of the casing,
    said at least one induction coil generating a magnetic field across which the toothed ferromagnetic rotor passes in order to generate eddy currents which brake a rotation of the shaft,
    said shaft being coupled to the combustion engine being tested.

2. The load machine according to claim 1, wherein the variable-reluctance motor is mounted in series with the brake means and comprises a stator secured to two opposed side walls through which the shaft rotatably passes,
    wherein one of said walls is adjacent to the casing of the brake means, a ferromagnetic rotor secured to the shaft and spaced axially from the toothed ferromagnetic rotor, and a plurality of excitation coils arranged on said stator around the periphery of the ferromagnetic rotor, so as to generate a magnetomotive force for driving the ferromagnetic rotor.

3. The load machine according to claim 2, wherein each of said at least one induction coil is powered with a dc current chopped at a fixed frequency and the plurality of excitation coils are powered with a dc current chopped at a higher frequency than said fixed frequency and which is a variable frequency.

4. The load machine according to claim 1, wherein the variable-reluctance motor is incorporated into the brake means,
    the rotor being made of a ferromagnetic material so as to act also as a rotor for the electric motor,
    the motor comprising a plurality of excitation coils housed in the casing to generate a magnetomotive force for driving the rotor.

5. The load machine according to claim 4, wherein the electric motor comprises at least one ferromagnetic stator inserted radially between the internal periphery of an induction coil coaxial with the rotor and the external periphery of said rotor,
    the excitation coils being arranged on the internal periphery of the stator so that their respective axes extend radially with respect to the rotor and are uniformly angularly spaced.

6. Machine according to claim 5, wherein the rotor has a number of radial arms which are uniformly angularly spaced and connected together by median webs in the shape of angular sectors of lesser thickness than the arms.

7. The load machine according to claim 4, wherein the electric motor comprises a ferromagnetic stator inserted axially between two side induction coils coaxial with the rotor, said stator peripherally surrounding the rotor, the plurality of excitation coils being arranged on the internal periphery of the stator in such a way that their respective axes extend radially with respect to the rotor and are uniformly angularly spaced.

8. The load machine according to claim 7, wherein the two induction coils extend one on each side of the plurality of excitation coils in the axial direction of the shaft.

9. Machine according to claim 8, wherein the rotor has a number of radial arms which are uniformly angularly spaced and connected together by median webs in the shape of angular sectors of lesser thickness than the arms.

10. The load machine according to claim 7, wherein the two induction coils are inserted radially between the plurality of excitation coils and the internal peripheral region of the casing.

11. Machine according to claim 10, wherein the rotor has a number of radial arms which are uniformly angularly spaced and connected together by median webs in the shape of angular sectors of lesser thickness than the arms.

12. Machine according to claim 7, wherein the rotor has a number of radial arms which are uniformly angularly spaced and connected together by median webs in the shape of angular sectors of lesser thickness than the arms.

13. The load machine according to claim 4, wherein the induction coil is coaxial with the rotor and peripherally surrounds it, the plurality of excitation coils being arranged on the internal faces of two side walls spaced axially from the casing so that their respective axes are parallel and uniformly angularly spaced with respect to the axis of the rotor, all of the axes of the plurality of excitation coils lying inside a circular cylinder centered on the axis of the rotor and having a smaller radius than the rotor.

14. The load machine according to claim 13, wherein the casing comprises, projecting from the internal faces of said side walls, a heat exchanger facing the rotor, the plurality of excitation coils being housed in slots in the heat exchanger.

15. Machine according to claim 14, wherein the rotor has a number of radial arms which are uniformly angularly spaced and connected together by median webs in the shape of angular sectors of lesser thickness than the arms.

16. Machine according to claim 13, wherein the rotor has a number of radial arms which are uniformly angularly spaced and connected together by median webs in the shape of angular sectors of lesser thickness than the arms.

17. The load machine according to claim 4, wherein two variable-reluctance motors are incorporated into the brake means, the rotor comprising, on each side of its plane, two axial extensions which are toothed at their periphery and located facing two ferromagnetic stators peripherally surrounding each axial extension of the rotor in the casing, two separate series of excitation coils being arranged on the internal periphery of each stator, to define the two variable reluctance motors.

18. The load machine according to claim 17, wherein the casing comprises, projecting from its internal side faces, a heat exchanger facing the rotor, the induction coil being coaxial with the rotor and peripherally surrounding the heat exchanger and the rotor, the aforementioned two stators being peripherally surrounded by the heat exchanger.

19. The load machine according to claim 4, wherein the rotor has a plurality of radial arms which are uniformly angularly spaced and connected together by respective median webs in the shape of angular sectors of lesser thickness than a thickness of the radial arms.

20. The load machine according to claim 19, wherein each radial arm extends radially beyond the median webs of the rotor to define a plurality of teeth at a periphery of the rotor.

21. The load machine according to claim 1, wherein said variable-reluctance motor comprises a toothed ferromagnetic rotor secured to said shaft.

22. The load machine according to claim 21, wherein the toothed ferromagnetic rotor of the variable-reluctance motor is not fitted with coils.

23. A load machine for a combustion engine test bench, comprising:

at least one eddy-current brake means associated with at least one variable-reluctance electric motor, said variable-reluctance electric motor comprising a toothed ferromagnetic rotor, said brake means comprising a toothed ferromagnetic rotor secured to a shaft mounted so as to rotate through a casing containing at least one induction coil borne by an internal peripheral region of the casing, said at least one induction coil generating a magnetic field across which the toothed ferromagnetic rotor of the brake means passes in order to generate eddy currents which brake a rotation of the shaft, said shaft being coupled to the combustion engine being tested.

24. The load machine according to claim 23, wherein the toothed ferromagnetic rotor of the variable-reluctance motor is not fitted with coils.

25. A load machine for a combustion engine test bench, comprising:

at least one eddy-current brake means mounted in series with at least one variable-reluctance electric motor, said brake means comprising a first toothed ferromagnetic rotor secured to a shaft mounted so as to rotate through a casing containing at least one induction coil borne by an internal peripheral region of the casing, said at least one induction coil generating a magnetic field across which the first toothed ferromagnetic rotor of the brake means passes in order to generate eddy currents which brake a rotation of the shaft, said shaft being coupled to the combustion engine being tested, wherein the variable-reluctance motor comprises a second toothed ferromagnetic rotor secured to the shaft and spaced axially from the first toothed ferromagnetic rotor, a stator secured to two opposed side walls through which the shaft rotatably passes, and a plurality of excitation coils arranged on said stator around the periphery of the second toothed ferromagnetic rotor, so as to generate a magnetomotive force for driving the second toothed ferromagnetic rotor, wherein one of said side walls is adjacent to the casing of the brake means.

26. The load machine according to claim 25, wherein the second toothed ferromagnetic rotor is not fitted with coils.

27. The load machine according to claim 25, wherein none of the rotors is fitted with coils.

28. A load machine for a combustion engine test bench, comprising:

at least one eddy-current brake means associated with at least one variable-reluctance electric motor, said brake means comprising a toothed ferromagnetic rotor secured to a shaft mounted so as to rotate through a casing containing at least one induction coil borne by an internal peripheral region of the casing, said at least one induction coil generating a magnetic field across which the toothed ferromagnetic rotor passes in order to generate eddy currents which brake a rotation of the shaft, said shaft being coupled to the combustion engine being tested, wherein the variable-reluctance motor is incorporated into the brake means, said toothed ferromagnetic rotor acting also as a rotor for the variable-reluctance motor, the variable-reluctance motor comprising a plurality of excitation coils housed in the casing to generate a magnetomotive force for driving the toothed ferromagnetic rotor.

29. The load machine according to claim 28, wherein the toothed ferromagnetic rotor is not fitted with coils.

* * * * *